United States Patent [19]

Pettit

[11] Patent Number: 4,988,231
[45] Date of Patent: Jan. 29, 1991

[54] BUSHING

[75] Inventor: Delmer E. Pettit, East Bend, N.C.

[73] Assignee: Industrial Fabricators Machine, Inc., Winston-Salem, N.C.

[21] Appl. No.: 383,744

[22] Filed: Jul. 21, 1989

[51] Int. Cl.⁵ .......................... D25G 3/20; F16B 2/00
[52] U.S. Cl. .................................. 403/370; 403/371; 403/336; 285/276
[58] Field of Search ...................... 403/370, 371, 336; 285/276

[56] References Cited

U.S. PATENT DOCUMENTS

| | | | |
|---|---|---|---|
| 1,908,844 | 5/1933 | Holtson | 285/276 |
| 2,331,498 | 10/1943 | Otto | 403/370 X |
| 2,441,467 | 5/1948 | Browning | 287/52.06 |
| 2,447,299 | 8/1948 | Williams | 287/53 |
| 2,452,458 | 10/1948 | Hahn | 287/53 |
| 2,487,128 | 11/1949 | Hahn | 287/53 |
| 2,556,151 | 6/1951 | Bremer | 287/52.06 |
| 2,736,205 | 2/1956 | Dunne | 74/230.3 |
| 2,927,805 | 3/1960 | Faccou | 285/276 X |
| 3,418,009 | 12/1968 | Pollia | 403/336 X |
| 3,738,691 | 5/1973 | Firth | 287/52.06 |
| 4,726,703 | 2/1988 | Ashley | 403/370 |

FOREIGN PATENT DOCUMENTS 121613  7/1946  Australia .......................... 403/370

Primary Examiner—Andrew V. Kundrat
Attorney, Agent, or Firm—Rodges, Coats & Bennett

[57] ABSTRACT

An bushing for securing machine elements. the two-piece bushing includes a body member having a central bore for receiving a shaft or the like and a flange which is rotatable with respect to the bore. The flange includes a plurality of bores for receiving securing means for securing the bushing to a hub or the like and a ridge portion for engaging at least a portion of the body member such that, when the securing means are tightened, the bushing and hub are drawn together. In the preferred embodiment, the outer surface of the end of the body member and the inner surface of the flange have complementary grooves therein for receiving a plurality of steel balls. When the balls are inserted within the groove, a ridge is formed which locks the flange and body member together in the axial direction. In addition, the bushing may include a ridge portion between the body member and the flange for preventing axial movement in at least one direction. The groove and ball arrangement allows the flange to rotate easily with respect to the body member to facilitae assembly and permits the bushing to be easily removed when necessary.

15 Claims, 2 Drawing Sheets

BUSHING

BACKGROUND OF THE INVENTION (1) Field of the Invention

The present invention relates generally to rotatable power transmitting devices, and more particularly, to a hub structure for adapting such rotative devices to shafts of different diameters.

(2) Description of the Prior Art

Stock sheaves are manufactured in certain standard size both with respect to different sheave diameters for a given shaft diameter and different shaft diameters for a sheave of given diameter. A well-known structure for mounting sheaves, sprockets, couplings, gears and similar machine elements onto shafts consist of a tapered bushing having a longitudinal slit extending the length thereof and a cylindrical bore therethrough for gripping the shaft internally and seating on a corresponding tapered surface in the bore of the hub of the machine element. One such bushing which has been particularly successful is set out in U.S. Pat. Nos. 2,452,458 and 2,487,128, issued to Hahn.

The bushing as taught by Hahn consists of a tapered body of the frustroconical shape having a radial annular flange disposed on the large end of the tapered body. The flange usually contains three plain unthreaded holes for receiving screws to extend through the flange into threaded bores at the end of the hub. Screws are inserted through the flange into the corresponding threaded holes in the hub and, as the screws are tightened, the tapered surface of the bushing and hub are drawn together. This, in turn, causes the slit bushing to contract about and securely grip the shaft, thereby securing the assembly together and preventing relative rotation between the shaft, bushing, and hub.

Reverse mounting is also possible where, for example, there is limited space adjacent the flange end of the bushing. In this case, screws are inserted through three plain, unthreaded holes in the hub and into corresponding threaded bores in the flange. As the screws are tightened, the tapered surfaces are drawn together and the bushing contracts around the shaft as described above. A key with a corresponding keyway may be provided between the shaft and the bushing to further guard against relative rotation between the members.

The bushings are normally produced either by machining the bushings from blanks of cast iron or by a powdered metal process which eliminates much of the machining.

Certain disadvantages with the above design become apparent. First, improper alignment of the bores and the flange with the corresponding bores in the hub greatly increase the difficulty in assembly. In fact, some disassembly of the machine itself may be necessary before the hub and flange of the bushing can be properly aligned. Second, bushings are subjected to very high torque especially where frequent reversal rotation occurs. In addition, stresses are concentrated in certain areas of the bushings such as the junction between the flange and the barrel. While a useful and inexpensive material, cast iron is generally not malleable and is subject to fracture. As a result, the prior art cast iron bushings are frequently broken when attempts are made to remove the adapter hub from the hub and shaft assembly.

Several approaches have been taken to overcome the problem of alignment of the flange and the hub. U.S. Pat. Nos. 2,441,467, issued to Browning, and 2,556,151, issued to Bremer, both disclose a detachable bushing for joining a wheel to a shaft. These patents teach a two-piece bushing having an outer flange and inner split tapered bore. One end of the tapered bore adjacent to the flange includes a circumferential groove adapted for receiving a bolt having a capped head for mating within the groove. These bolts, once secured to the pulley or the like, serve to draw the bushing into tight gripping arrangement with the shaft when they are threaded in one direction and serve to force the bushing out of gripping or frictional engagement with the shaft when threaded in the opposite direction.

A similar function is illustrated in U.S. Pat. No. 2,447,299, issued to Williams, in which a screw collar is combined within a circumferential groove located at one end of a tapered bore. The screw collar is adapted to engage an internal thread in the wheel bushing bore so when it is turned in one direction the sleeve will be shifted into binding engagement with the shaft surface in the bushing bore and, when turned reversibly, will release the sleeve. The screw collar is split longitudinally to reduce the thickness at a point opposite the split in order that the screw sleeve can be opened up for placement onto the groove and afterwards compressed for permanent retention.

Certain disadvantages become apparent with such designs. First, the bushing assemblies as taught by Bremer and Browning both localize the application of force on the bushing by means of the screw heads along three or at most four locations. In addition, because part of the screw cap forms the abutment, a bending moment is applied to the screw body which may result in premature failure. Finally, the rotation of the cap with respect to the bushing abutment surface makes accurate measurements of torque difficult or impossible and may damage the surfaces of the bushing in the caps.

Likewise, the fastening means taught by Williams, makes accurate measurement of the torque applied impossible. In addition, Williams requires a special bushing to receive the screw collar. Finally, because the screw collar is split, this presents a safety hazard when used in high-speed rotating machinery since the collar may become separated or broken during operation.

It has thus become desirable to develop a bushing for securing pulleys, sprockets, couplings and the like to rotatable shafts which is easy to align and remove while, at the same time, eliminating the prior art problems of localized stresses or limited use to specific hubs, and which is inherently safe for use with high-speed rotating equipment.

SUMMARY OF THE INVENTION

The present invention solves the aforementioned problems associated with the prior art by providing a split, two-piece bushing having a flange which is rotatable with respect to a split tapered body member having a control bore for receiving a shaft, thereby allowing adjustment of the tangential position of the flange with respect to the central bore. The rotatable flange includes a plurality of bores for receiving securing means, such as bolts or the like, a hub or the like and a ridge portion for engaging at least a portion of the tapered body member such that, when the bolts are tightened, the tapered surfaces of the bushing and the hub are drawn together. This in turn causes the split bushing to contract and securely grip the shaft thereby securing the shaft together in preventing relative rotation between the shaft, bushing, and hub.

In the preferred embodiment, the outer surface of the tapered body member adjacent to the flange and the inner surface of the flange have complementary grooves therein for receiving a plurality of steel balls. When the balls are inserted within the groove, a ridge is formed which locks the flange and body member together in the axial direction. Also, in the preferred embodiment, the balls are introduced by means of a conduit drilled through one portion of the flange. Thus, the groove and ball arrangement allows the flange to rotate easily with respect to the tapered body member to facilitate assembly and, in addition, permits the bushing to be easily removed when necessary.

Accordingly, one aspect of the present invention is to provide an adapter for securing machine elements. The adapter includes a body member having two ends; a flange disposed on one end of the body member and the flange and operable to permit tangential rotation between the body member and the flange while at the same time preventing axial movement therebetween.

Another aspect of the present invention is to provide a bushing for securing a hub to a shaft. The bushing includes a body member having two ends and a center opening for receiving the shaft; a ridge portion located between the body member and the hub for preventing movement therebetween in at least one axial direction; and retaining means located therebetween the body member and the hub and operable to permit tangential rotation between the body member and the hub while at the same time preventing axial movement therebetween.

Still another aspect of the present invention is to provide a bushing for securing machine elements having a hub with a central opening to a rotatable shaft. The bushing includes a body member having a central bore for receiving the shaft; a flange disposed on one end of the body member; a ridge portion located between the body member and the flange for preventing movement therebetween in one axial direction; and retaining means located therebetween the body member and the flange and operable to permit tangential rotation between the body member and the flange while at the same time preventing axial movement therebetween.

These and other aspects of the present invention will be more clearly understood after review of the following description of the preferred embodiment of the invention, when considere with the drawings.

DESCRIPTION OF THE PREFERRED EMBODIMENTS

Figure 1:
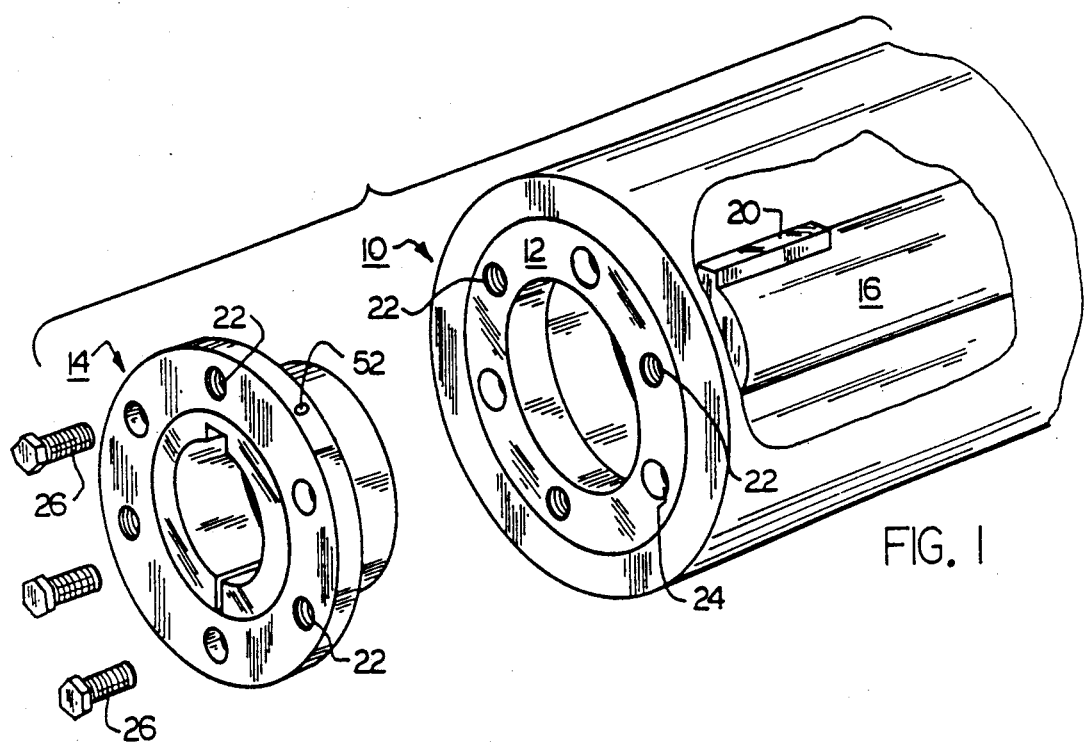
FIG. 1 is partial exploded perspective view of a drum assembly employing the present invention.

Turning now to the drawings in general and FIG. 1 in particular, it will be understood that the illustrations are for the purpose of describing a preferred embodiment of the invention and not intended to limit the invention thereto. As best seen in FIG. 1, a drum assembly, generally designated 10, is shown utilizing the present invention. Drum assembly 10 consists in part of a hub 12, flanged bushing 14, and shaft 16. Shaft 16 may optionally include a shaft key 20 for further restricting the relative movement between the shaft 16 and the flanged bushing 14. Hub 12 and flanged bushing 14 include a plurality of threaded bores 22 and a plurality of plain bores 24. Attachment means 26 are inserted through the flanged bushing 14 into the corresponding threaded bores 22 of the hub 12 and, as the screws 26 are tightened, the surfaces of the bushing 14 and hub 12 are drawn together. This in turn causes the bushing 14 to contract around and securely grip the shaft 16 thereby securing the drum assembly 10 together and preventing relative movement between the shaft 16, bushing 14 and hub 12. Note that the plurality of threaded bores 22 and plain bores 24 associated with the flanged bushing 14 are usually equally spaced apart with respect to one another. However, the bores 22,24 associated with the hub 12 are typically slightly offset with respect to the threaded and plain bores; respectively, the facilitate removal of the bushing 14, as will be discussed later.

Figure 2:
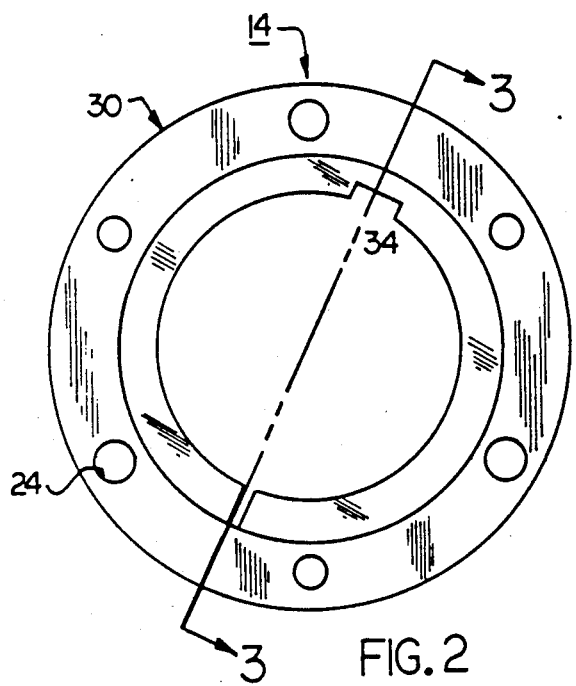
FIG. 2 is end view of the flanged bushing shown in FIG. 1, illustrating the relationship between the flange and bushing barrel.

Turning now to FIG. 2 there is shown and end view of the flanged bushing 14, shown in FIG. 1. Flanged bushing 14 includes a flange assembly generally designated 30 which is concentrically mounted to one end of barrel portion 32 of bushing 14. In the preferred embodiment, a keyway 34 is provided along the inner surface of the barrel portion 32 of the bushing 14 for receiving shaft key 20 to further guard against relative movement between shaft 16 and flange bushing 14. Barrel portion 32 of the flange bushing 14 preferably includes a longitudinal slit 36 extending the length thereof for gripping the shaft 16 internally when the tapered surfaces of the flanged bushing 14 and hub 12 are drawn together.

Figure 3:
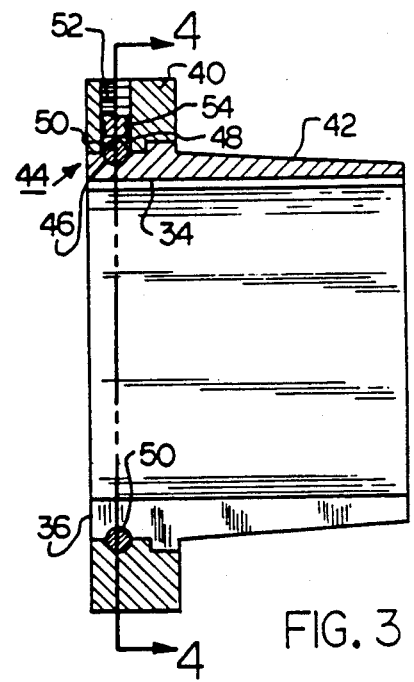
FIG. 3 is a cross-sectional of the flanged bushing shown in FIG. 2, taken along line 3—3, illustrating the complementary grooves therein.

Turning now to FIG. 3, there is shown a cross-sectional view of the flange bushing 14 shown in FIG. 2 taken along line 3—3. The flanged bushing 14 is actually comprised of three sub-assemblies: a flange 40; a tapered barrel 42; and a retaining means generally designated 44. In the preferred embodiment, flange 40 is constructed from a single piece of material stock since it has been found that the faces present during assembly and operation may be sufficient to cause split or two part flanges to warp or buckle. In the preferred embodiment, retaining means 44 includes a pair of complementary semi-hemispherical circumferential receiving grooves 46,48. A plurality of steel balls 50 are received by receiving grooves 46,48. The dimensions of the receiving grooves 46,48 can be varied to suit the dimensions of various sized balls 50 as long as the same general proportions are substantially maintained. In the preferred embodiment, a threaded bore 52 extends through a portion of flange 40 in order to permit the plurality of balls 50 to be inserted to complete the assembly 14. A set screw 54 is threaded into threaded bore 52 for retaining the balls 50 in place.

Figure 4:
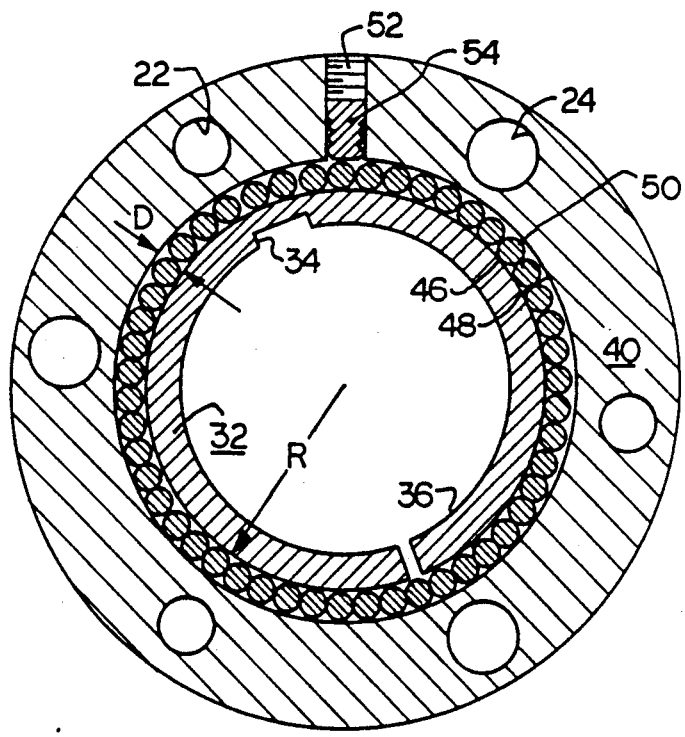
FIG. 4 a cross-sectional view of the flange bushing shown in FIG. 3, taken along line 4—4.

Referring to FIG. 4, a cross-sectional view of the flange bushing 14 shown in FIG. 3 taken along line 4—4 is shown. As is readily apparent, the radius R of the groove is dependent to a large degree on the relative dimensions of the flange and bore. For example, for in a bushing sized to fit a 3-7/16" diameter shaft, the preferred radius R is 2¼". These dimensions provide a groove having a circumferential length sufficient to receive approximately 56 steel balls having a diameter S of ¼". Based on these dimensions, the plurality of steel balls 50 contact approximately 88% of the circumferential length of receiving grooves 46,48. Similarly, a bushing sized to fit a 2-3/16" diameter shaft would have a groove having a radius of approximately 1-9/16". The circumferential length of the groove is sufficient to contain approximately 38 similar steel balls. This provides a substantially uniform distribution of force between the flange 40 and the tapered barrel 32.

Flange assembly 14 is normally made of steel. However, other materials, such as aluminum, or metals that can be manufactured by machine or a casting processes could also be used so long as the material has sufficient strength for the application.

Figure 5:
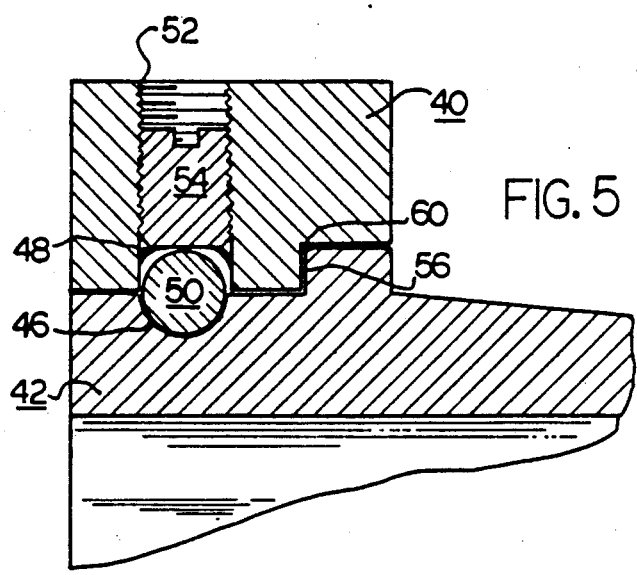
FIG. 5 is an enlarged fragmentary cross-sectional view of the flange bushing shown in FIG. 3, illustrating the relationship between the flange and the bushing barrel shoulder.

Turning finally to FIG. 5, there is shown an enlarged fragmentary cross-sectional view of the flange bushing 14 shown in FIG. 3 illustrating the relationship between the bushing barrel and flange shoulders 56,60 respectively. In the preferred embodiment, the perimeter of tapered barrel 42 includes a shoulder portion 56. Likewise, the inner perimeter of flange 40 includes a complementary shoulder portion 60. Relative dimensions of receiving grooves 46,48 and steel balls 50 are chosen such that when attachment means 26 are inserted through the flange 40 into the corresponding threaded bores 22 of hub 12 and tightened to draw together tapered surface of the bushing 14 and hub 12, substantially all the axial load between the flange 40 and the tapered bore 42 is distributed along shoulders 56,60. Conversely, when the flanged bushing 14 is removed from the shaft 16 and hub 12, the axial force is distributed along receiving grooves 46,48 by means of steel balls 50. Since the amount of force required to draw the tapered surfaces of the bushing 14 and hub 12 together can be considerably higher the force required to remove the flanged bushing 14, this arrangement minimizes the load required to be absorbed by the retaining means 44.

From the foregoing description of the structure, it can be readily seen that no difficult or unusual machining operations are necessary in producing the flange bushing 14 or its related parts. Consequently, bushings of this type may be inexpensively and rapidly manufactured.

In assembling drum 10 with shaft 16, flanged bushing 14 having the proper external and internal diameters is selected and inserted into hub 12 until friction prevents further insertion. The outer flange 40 is then rotated to align the plurality of plain bores 24 in the flange 40 with the plurality of threaded bores 22 in the hub. Attachment means 26 are then inserted through the plain bores 24 of flange 40 and into threaded bores 22 of hub 12. The flanged bushing 14 can then be rotated to align keyway 34 with shaft key 20. Attachment means 26 are then threaded into their respective bores 22 to cause the shoulder 60 of flange 40 to bear on the shoulder 56 of tapered barrel 42 to thereby force tapered barrel 42 into the tapered bore of hub 12. During this operation, essentially of the axial force is distributed between shoulders 56 and 60.

Generally, the attachment means 26 will be threaded inwardly a short distance at a time, one after another, around the circumference of the flange 40 so as not to misalign the tapered barrel 40 within the hub 12. Since the inside diameter of the hub 12 and the external surface of the tapered barrel 42 are tapered at the same angle, as is well known, and since the tapered bore is longitudinally split, inward movement of the flanged bushing 14, caused by attachment means 26 being threaded into holes 22, will contract the tapered barrel 42 into tight gripping arrangement with the shaft 16 to provide a frictional connection. Alternatively, depending on the geometry of the assembly 10, the attachment means 26 may be inserted through hub 12 and threaded into flanged bushing 14 in the same manner.

To remove the flanged bushing 14, it is only necessary to remove attachment means 26, reinsert attachment means 26 into the plurality of threaded bores 22, and push against the surface of hub 12 to remove flanged bushing 14. Alternatively, pry bars or a hammer may be sufficient to loosen the flanged bushing 14 sufficiently such that it may be removed by hand.

Certain modifications and improvements will occur to those skilled in the art upon reading of the foregoing description. By way of example, cylindrical bearings could be substituted for steel balls 50. Alternatively, a flexible rod or spring could be inserted in place of the steel balls 50 so long as it permitted rotation between the flange and tapered least during removal of the bearing. Finally, for larger diameter bushings, it may be desirable to add a second receiving groove 46,48 for increased strength and a better fit between the bore and flange. It should be understood that all such modifications and improvements have been deleted herein for the sake of conciseness and readability but are properly within the scope of the following claims.

I claim:

1. A bushing for securing a hub to a shaft, said bushing having a body member having two ends, a flange located on one of said ends to define with said body member a contiguous planar end surface and a central bore for receiving the shaft; and
   (a) a ridge potion located between said body member and said flange for preventing movement therebetween in at least one axial direction, said ridge portion being confined to the region between said body member and said flange and recessed within said flange to permit said flange and ridge portion to be mounted substantially flush against the end surface of said hub; and
   (b) retaining means located therebetween said body member and said flange and operable to permit tangential rotation between said body member and said flange while at the same time preventing axial movement therebetween.

2. The apparatus according to claim 1, wherein said retaining means is operable to prevent axial movement in the other axial direction.

3. The apparatus according to claim 1, wherein said retainer means includes:
   (i) at least one pair of spaced abutments located therebetween each of said body member and said flange and aligned with one another to define a groove; and
   (ii) a retainer insertable in said groove and adapted to provide substantially uniform contact with the surface of said groove.

4. The apparatus according to claim 3, wherein said retainer includes a plurality of balls.

5. A bushing for securing machine elements having a hub with a central opening to a rotatable shaft, said bushing comprising:
(a) a body member having a central bore for receiving the shaft;
(b) a flange disposed on one end of said body member to define with said body member a contiguous planar end surface;
(c) a ridge portion located between said body member and said flange for preventing movement therebetween in one axial direction, said ridge portion being confined to the region between said body member and said flange and recessed within said flange to permit said flange and ridge portion to be mounted substantially flush against the end surface of said hub; and
(d) retaining means located therebetween said body member and said flange and operable to permit tangential rotation between said body member and said flange while at the same time preventing axial movement therebetween, said retaining means including:
(i) at least one pair of spaced abutments located therebetween each of said body member and said flange and aligned with one another to define a groove; and
(ii) a retainer insertable in said groove and adapted to provide substantially uniform contact with the surface of said groove.

6. The apparatus according to claim 5, wherein said body member is generally cylindrical.

7. The apparatus according to claim 6, wherein said body member includes a large end and a small end.

8. The apparatus according to claim 7, wherein said body member is tapered therebetween said large end and said small end.

9. The apparatus according to claim 6, wherein said body member is split longitudinally and radially.

10. The apparatus according to claim 7, wherein said flange is disposed on said large end of said body member.

11. The apparatus according to claim 7, wherein said flange includes a portion projecting outwardly from said large end.

12. The apparatus according to claim 5, further including a plurality of bores formed in said flange for receiving securing means for selectively securing said bushing in the opening in the hub on onto the shaft and for removing said bushing from the hub opening.

13. The apparatus according to claim 5, further including a key formed integrally with said body member in said central bore and projecting inwardly and axially therein.

14. The apparatus according to claim 5, wherein said retaining means is operable to prevent axial movement in the other axial direction.

15. The apparatus according to claim 14, wherein said retainer includes a plurality of balls.

* * * * *